Feb. 15, 1955  R. C. HOFFMAN  2,701,972
AXLE HOUSING CONSTRUCTION
Filed Jan. 16, 1952  4 Sheets-Sheet 2

INVENTOR.
Roscoe C. Hoffman
BY
Harness, Dickey & Pierce
ATTORNEYS.

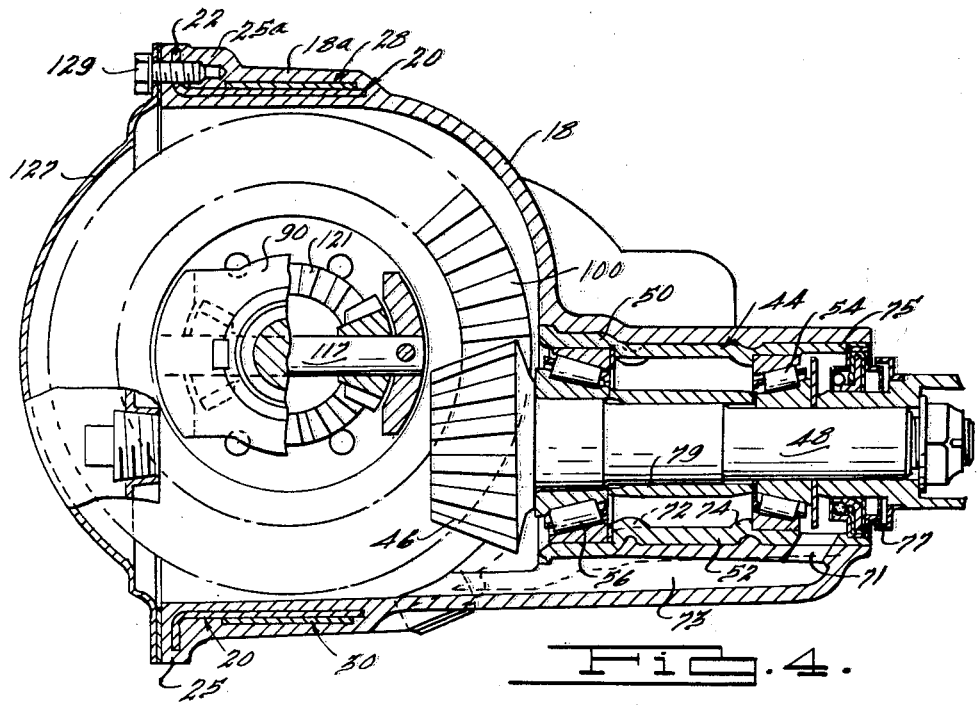
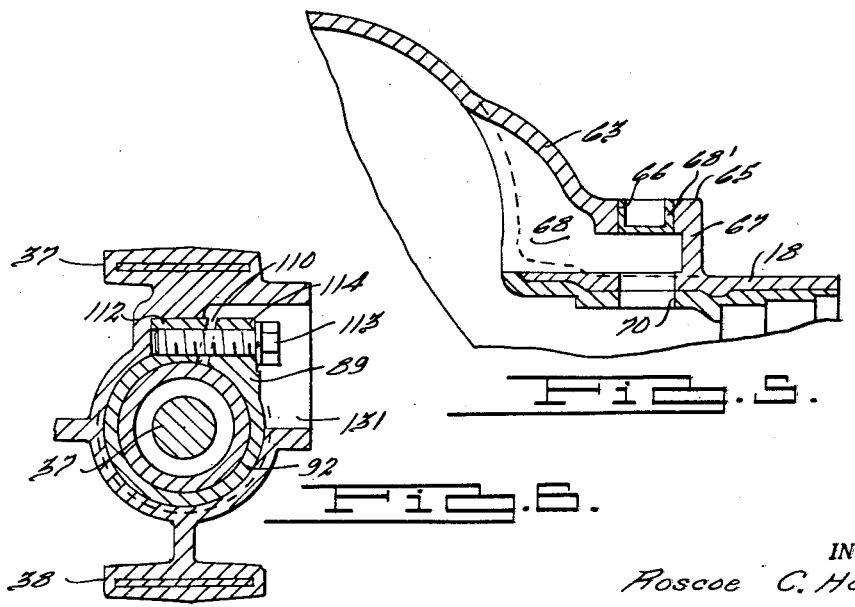

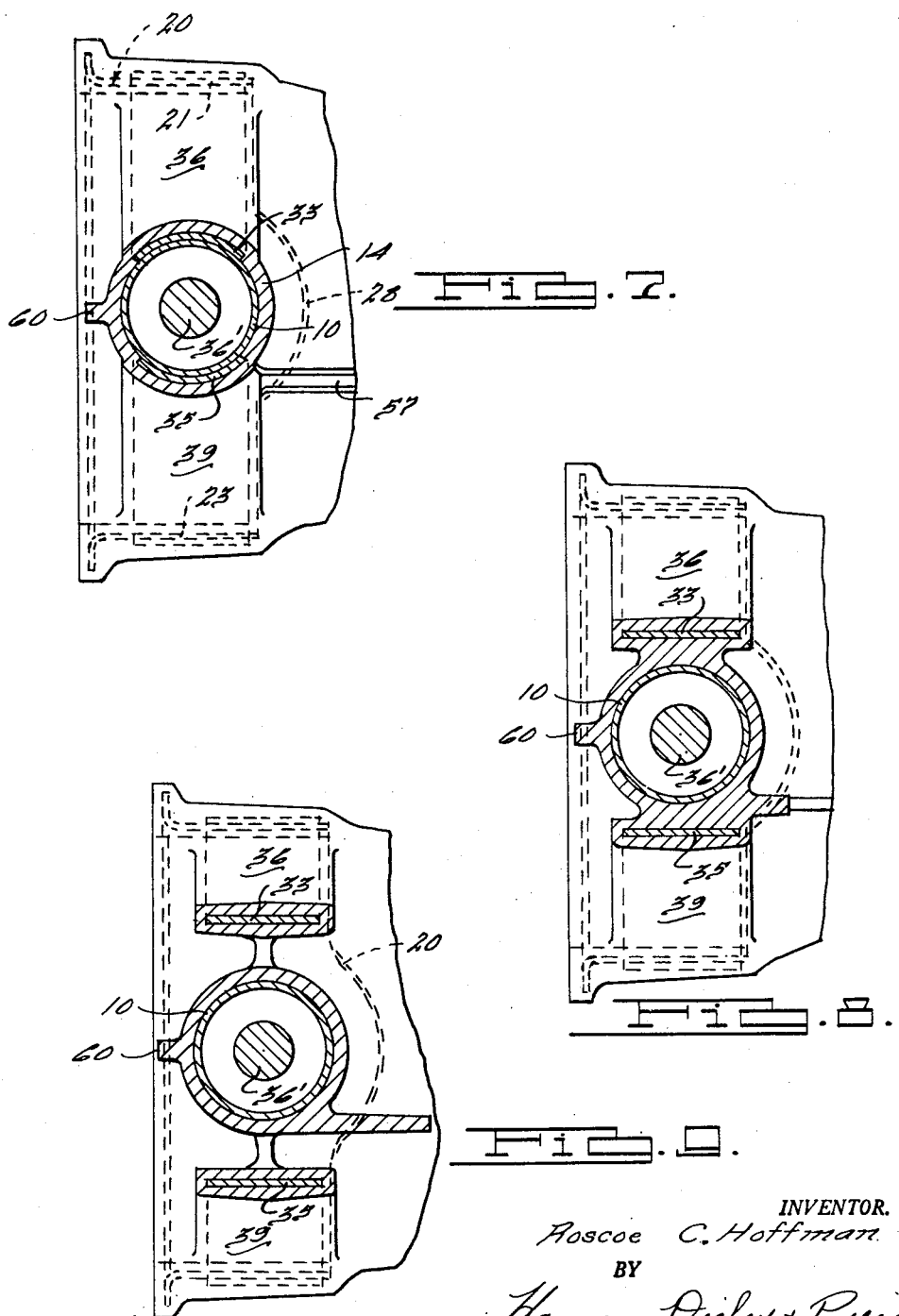

United States Patent Office 2,701,972
Patented Feb. 15, 1955

2,701,972

AXLE HOUSING CONSTRUCTION

Roscoe C. Hoffman, Detroit, Mich.

Application January 16, 1952, Serial No. 266,664

5 Claims. (Cl. 74—607)

This invention relates to the construction of housings for the driving axles of motor vehicles. Such axle housings have hitherto been constructed in various ways. Sand-castings, forgings, and sheet metal constructions have been employed. The present invention is concerned with an improved axle housing of a novel composite construction incorporating a die-cast outer casing and internal reinforcing and supporting portions formed of sheet metal and tubes.

It is one of the objects of the present invention to provide an improved axle housing construction which is of light weight and increased strength and rigidity.

A further object is to provide an improved axle housing construction having a one piece die casting as an outer casing and which is extremely simple and less costly of manufacture than axle housing constructions heretofore known.

Other objects and advantageous features of the invention will be pointed out or will become apparent as the description proceeds.

In the drawings:

Fig. 4 is a cross-sectional view taken substantially on the line 4—4 of Fig. 1 and looking in the direction of the arrows;

Fig. 5 is a fragmentary sectional view taken substantially along the line 5—5 of Fig. 3 and looking in the direction of the arrows;

Fig. 6 is a cross-sectional view taken substantially along the line 6—6 of Fig. 2 and looking in the direction of the arrows;

Fig. 7 is a fragmentary sectional veiw taken substantially along the line 7—7 of Fig. 2 and looking in the direction of the arrows;

Fig. 8 is a fragmentary cross-sectional view taken substantially along the line 8—8 of Fig. 2 and looking in the direction of the arrows; and Fig. 9 is a fragmentary cross-sectional view taken substantially along the line 9—9 of Fig. 2 and looking in the direction of the arrows.

Figure 1:
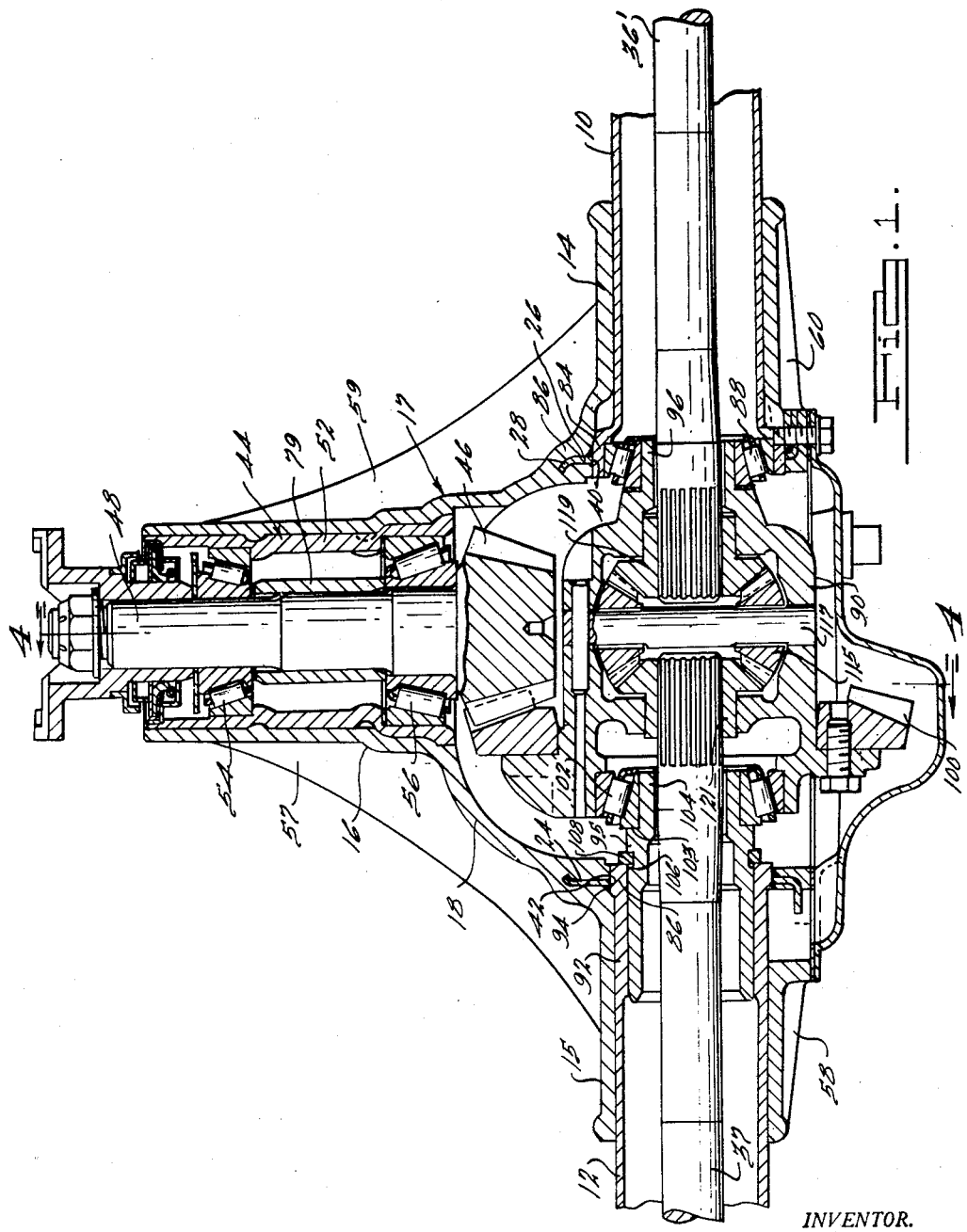
Figure 1 is a horizontal sectional view of a driving axle illustrating a housing construction embodying the principles of the present invention, with the ends of the axle shafts and shaft housing tubes broken away.

The housing construction of this invention is generally comprised of die cast portions which are integrally cast around and reinforced by sheet metal and tubular parts. The housing may be constructed by preliminarily positioning sheet metal and tubular reinforcing portions 10, 12, 20, 28, 30, 44 in a mold and thereafter casting a suitable metal, such as an aluminum alloy, around such a reinforcing and supporting structure. Certain of the reinforcing parts are initially secured together as by welding before being placed in the mold.

Referring in detail to the drawings it may be seen that the axle shaft housing tubes 10, 12 which may be formed of steel tubing, project into and form an inner reinforcement for the die cast socketlike portions 14, 15. Another steel tube 44 serves as a reinforcing element for forwardly extending cylindrical cast section 16 which is joined to the end portions 14, 15 by the integral bell portion 18. Additionally it will be noted that the inner ends of tubes 10, 12 function as supports for bearing means carrying the differential case 90, and that tube 44 supports means for journaling pinion shaft 48. Portions 20, 28, 30, serve to additionally reinforce the housing, as will hereinafter be more fully discussed.

As best seen in Figs. 1 and 4, the housing structure generally designated 17 is comprised of co-axial socketlike portions 14, 15 and forwardly extending portions 16, 18, cast integral with the socketlike portions 14 and 15. The tubular section 16 has a rear opening 19 bounded by a flange 25 which forms the rearward portion of a substantially thickened portion 18a integral with the bell section 18. Flange 25 is provided with a plurality of spaced bosses 25a adapted to receive screws 129 which secure rear cover plate 127 in place. (The terms "front," "rear," "left" and "right" as applied herein relate to the positioning of parts with respect to a vehicle in which the axle is installed.)

The rearward portion 18a of bell section 18 has the general shape of a banjo or short cylindrical section, is reinforced by sheet metal banjo section liner 20. As may best be seen in Fig. 2, banjo section liner 20 is of looped form and may be stamped of sheet steel. Liner 20 includes an upper curvate portion 21 and a lower curvate portion 23 which are united or joined together by generally flat side portions 24 and 26. The axis of liner 20 is substantially parallel to the axis of forward extending portions 16, 18, and a vertical plane passing diametrically through tubes 10, 12 would approximately bisect banjo section liner 20 in its front-rear dimension. Banjo section liner 20 has at its rear end an outturned flange 22 which is drilled and tapped with the bosses 25a, to be engaged by screws 129. The vertical side portions 24, 26 of liner 20 are widened in the area of socket portions 14, 15 and extend upon either side of the tube-receiving openings therein, portions 24, 26 being inwardly curved at their forward ends as shown at 28. At the sides of liner 20 and in axial alignment with the tubes 10 and 12, openings designated 40 and 42 are formed in the liner to permit the extension of the axle shafts 36', 37 therethrough and to accommodate other supporting portions which will be referred to hereinafter.

Additional strengthening and reinforcement is provided, including a pair of sheet metal straps generally designated 28, 30, of steel or the like, which are welded to the axle tubes 10, 12, are also welded to the curved portions 21, 23 of banjo section liner 20. Straps 28, 30 have generally arcuate shoe portions 32, 34 respectively, adapted to engage or partially encircle and which are welded to the inner ends of tubes 10, 12. Straps 28, 30 are inclined upwardly and downwardly respectively from the shoelike portions 32, 34, to the curved portions 21 and 23 of liner 20, and are welded thereto, as stated, extend across liner 20, and then angularly converge on tube 10 and terminate in shoelike portions 33 and 35 welded to tube 10. As may be seen in Figs. 7, 8 and 9, straps 28, 30 are of substantially uniform width throughout their length.

Liner tube 44 in the forwardly extending tubular section 16 is provided with bearing supporting means for the driving pinion 46 and pinion shaft 48. Liner tube 44 is somewhat enlarged and flared at its rear end for anchorage and to receive the bearing assembly 56, as indicated at 50. Nearer its forward end the tube 44 is adapted to receive another bearing assembly 54 which coacts with bearing 56 to journal the pinion shaft 48. The tube 44 is swaged, and/or is upset and formed to provide for reception of the bearing assemblies and to form locating lugs as 72, 74 therefor. Suitable ribs as 55, 57, 59 are cast in the enclosing die cast material, to reinforce tubular section 16 against deflection. An additional hollow riblike portion 61 serves as an oil conducting means for lubricant thrown forwardly by the ring-gear 100. Such oil flows through hole 70 to the pinion shaft bearings. It will be appreciated that hollow rib 61 is so arranged as to facilitate the boring of oil hole 70 through the outer wall of section 16 and liner 44 in one machine setting by boring through shelf 65 to form aperture 66 and oil hole 70. Thereafter aperture 66 may be sealed as with a plug 68'. A lubricant retainer 77 seals the forward end of tube 44. A spacing sleeve 79 is positioned adjacent to the spindle 48 between the inner race or cone portions of the roller bearing assemblies 54 and 56. Additional reinforcing gussets 58, 60 are provided at the rear of tubular socket portions 14, 15.

Tube 10 is flared outwardly at its inner end to provide cylindrical spigot 84 which is welded to portion 26 of liner 20 and which is formed internally to receive bearing assembly 88 which journals the right side of differential case 90. On the left side tube 12 is flared outwardly at its inner extremity to form sleeve 92 which is welded to portion 24 of liner 20 as illustrated at 94. It will be noted that differential case 90 is formed with a spigot 96 journaled in the cone of bearing assembly 88. The construction and arrangement of the bearing supporting and adjusting means may correspond to the disclosure of my Patent No. 2,563,680, granted August 7, 1951. Between sleeve 92 and the axle shaft 37 an adjustable bearing supporting sleeve 95 is interposed and slidably fitted in and supported by sleeve 92. The interfitted parts may be machined and the sleeve 95 projects from sleeve 92 into the interior of the differential housing and seats the cone of the left side tapered roller bearing assembly 102 which supports the differential case 90. The cone portion of the bearing assembly 102 is fitted against a shoulder 103 formed by a reduced portion 104 on the inner end of sleeve 95. The portion of the sleeve 95 which projects into the differential housing is provided with a peripheral groove 106 located adjacent the inner end of the sleeve 92 and adapted to receive a snap ring 108 which projects outwardly from sleeve 95 and bears against the inner end of sleeve 92 to positively lock the sleeve 95 against outward movement. Near its inner end tubular portion 92 is peripherally thickened and such thickened portion is split substantially radially as indicated at 110 so that the thickened portion may act as a clamping ring. As best shown in Fig. 6, such thickened clamping ring portion is also provided adjacent to the split area 110 with a pair of angularly upwardly and rearwardly extending integral lug portions 112 and 114. A clamping screw 113 is engaged with such lug portions to enable tightening and loosening the clamping ring section 92.

The differential components as indicated are of substantially conventional construction although it will be understood that their construction may be varied. The case 90 supports a ring gear 100 meshing with the driving pinion 46. The differential planet gears 115 are mounted upon radial stub shafts 117 and mesh with the differential side gears 119 and 121 which are rigidly mounted upon the axle shafts 36 and 37 respectively.

Inasmuch as all of the anti-friction bearings are of the tapered type and the gears are bevel gears, it will be understood that simple and accurate adjustment of all clearances may be effected by loosening the screw 113 to free clamping portion 92, moving the sleeve 95 to a desired position, inserting a snap ring 108 of the proper thickness to lock sleeve 95 against outward movement with respect to such position, and then tightening the clamping portion 92.

Figure 2:
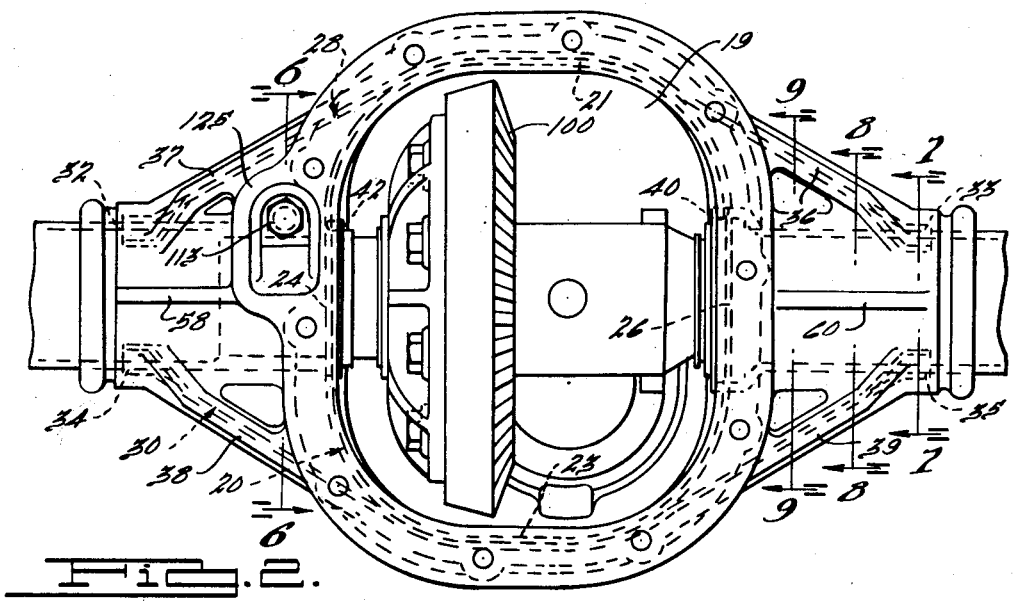
Fig. 2 is a fragmentary rear elevational view of the axle of Fig. 1 with the back cover removed.
Figure 3:
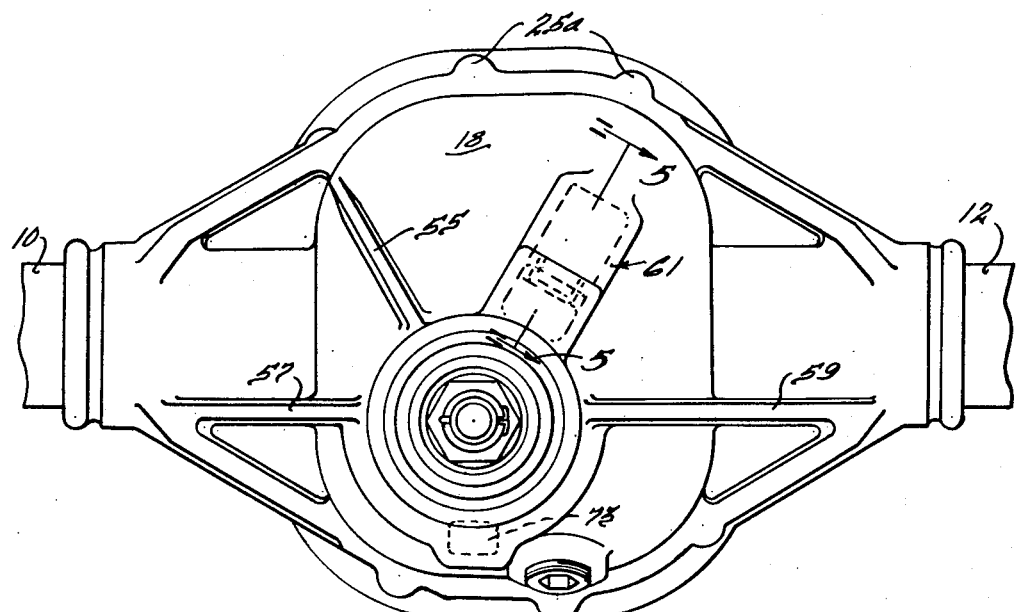
Fig. 3 is a fragmentary front elevational view of the same.

Rear flange 25, defining the rearward aperture 19, is extended to the left as seen in Fig. 2 at 125. Cover 127 is similarly extended laterally. An opening 131 Fig. 6 is formed in the extended flange portion 125 in alignment with the clamping screw 113 so that access may be had to such screw by removing the back cover 127.

While only a single embodiment of this invention has been illustrated and described, it will be apparent to those skilled in the art that the invention is susceptible to modification, change, and variation without departing from the spirit and scope of the invention as set forth in the appended claims.

What is claimed is:

1. A housing for a driving axle and differential assembly comprising a composite structure including die cast parts comprising a pair of coaxial tubular portions and a forwardly extending section, a flared banjo portion interposed betwen said tubular portions and integral therewith, sheet metal reinforcement imbedded in said banjo portion, said tubular portion and said forwardly extending section, means bridging the joint between said banjo portion and both of said tubular portions and sheet metal straps imbedded in said bridging means.

2. A housing in accordance with claim 1 wherein said sheet metal reinforcement comprises a pair of coaxial sleeve portions disposed in said tubular portions, a generally cylindrical banjo section liner interposed between said sleeve portions, said liner being provided with side walls extending transversely across the inner ends of said sleeve portions and apertured in substantial axial alignment with such sleeve portions, said sleeve portions being secured to said liner, and said sheet metal straps having their end portions secured to said sleeves and extending continuously from one said sleeve across said banjo section liner to the other said sleeve.

3. A housing in accordance with claim 1 wherein said sheet metal reinforcement comprises a pair of coaxial sleeve portions disposed in said tubular portions, a generally cylindrical banjo section liner interposed between said sleeve portions, said liner being provided with side walls extending transversely across the inner ends of said sleeve portions and apertured in substantial axial alignment with such sleeve portions, said sleeve portions being secured to said liner, a lower strap and an upper strap disposed in axial alignment with said sleeve portions, both said straps extending continuously from one said sleeve to the other said sleeve and having their mid portions superimposed upon said liner and their end portions secured to said sleeves.

4. A housing in accordance with claim 1 wherein said sheet metal reinforcement comprises a pair of coaxial sleeve portions disposed in said tubular portions, a generally cylindrical banjo section liner interposed between said sleeve portions, a sleeve portion disposed in the forwardly extending section, said liner being provided with side walls extending transversely across the inner ends of said sleeve portions and apertured in substantial axial alignment with such sleeve portions, said sleeve portions being secured to said liner, a lower strap and an upper strap disposed in axial alignment with said sleeve portions, both said straps extending continuously from one said sleeve to the other said sleeve and having their mid portions superimposed upon said liner and their end portions secured to said sleeves.

5. A housing in accordance with claim 1 wherein said sheet metal reinforcement comprises a pair of coaxial sleeve portions disposed in said tubular portions, a generally cylindrical banjo section liner interposed between said sleeve portions, a sleeve portion disposed in the forwardly extending section, said liner being provided with side walls extending transversely across the inner ends of said sleeve portions and apertured in substantial axial alignment with such sleeve portions, said sleeve portions being secured to said liner, a lower strap and an upper strap disposed in axial alignment with said sleeve portions, both said straps extending continuously from one said sleeve to the other said sleeve and having their mid portions superimposed upon and secured to said liner and their end portions secured to said sleeves, said die casting having a plurality of gussets bridging said coaxial tubular portions and said forwardly extending section.

References Cited in the file of this patent

UNITED STATES PATENTS

| | | |
|---|---|---|
| 1,472,441 | Sherbondy | Oct. 30, 1923 |
| 1,533,152 | Wadell | Apr. 14, 1925 |
| 1,561,081 | John | Nov. 10, 1925 |
| 1,570,837 | Hoy et al. | Jan. 26, 1926 |
| 1,989,996 | Mautsch | Feb. 5, 1935 |
| 2,095,055 | Campbell | Oct. 5, 1937 |
| 2,269,916 | Price | Jan. 13, 1942 |
| 2,289,251 | Donaldson | July 7, 1942 |
| 2,563,680 | Hoffman | July 7, 1951 |

OTHER REFERENCES

Publication: Die Casting for Engineers, 1942, New Jersey Zinc Co., page 131.